United States Patent [19]

Kuwabara et al.

[11] Patent Number: 4,637,680
[45] Date of Patent: Jan. 20, 1987

[54] BEAM CONVERTER IN OPTICAL MEASURING INSTRUMENT

[75] Inventors: Yoshiharu Kuwabara, Machida; Hiroyoshi Hamada, Yokohama, both of Japan

[73] Assignee: Mitutoyo Mfg. Co., Ltd., Tokyo, Japan

[21] Appl. No.: 621,565

[22] Filed: Jun. 18, 1984

[30] Foreign Application Priority Data

Jun. 24, 1983 [JP] Japan .............. 58-98433[U]

[51] Int. Cl.$^4$ ............................................. G02B 26/10
[52] U.S. Cl. .................................. 350/6.8; 352/108; 358/206
[58] Field of Search ............. 350/486, 612, 6.5, 6.6, 350/6.7, 6.8; 358/205, 206; 352/106–108

[56] References Cited

U.S. PATENT DOCUMENTS

| | | | |
|---|---|---|---|
| 2,285,593 | 6/1942 | Lemert | 358/206 |
| 3,040,627 | 6/1962 | Bohn et al. | 352/108 |
| 3,622,221 | 11/1971 | Kossyk et al. | 350/6.8 |
| 3,765,774 | 10/1973 | Petrohilos | |
| 3,905,705 | 9/1975 | Petrohilos | |
| 4,043,632 | 8/1977 | Jeffrey et al. | 350/6.8 |
| 4,141,620 | 2/1979 | Goshima et al. | 350/6.8 |
| 4,512,626 | 4/1985 | Kamiya et al. | 350/6.8 |

*Primary Examiner*—John K. Corbin
*Assistant Examiner*—Loha Ben
*Attorney, Agent, or Firm*—Parkhurst & Oliff

[57] ABSTRACT

This disclosure depicts a ray beam converter having a rotary mirror driven by a motor, for reflecting ray beams to convert the same into rotary scanning ray beams in an optical measuring instrument wherein the ray beams from a beam generator are converted into the rotary scanning ray beams to be scanned in one direction and dimensions of a workpiece to be measured are measured by utilization of the rotary scanning ray beams. A rotor of the motor is rotatably supported by bearings at a plurality of positions in a direction of the rotary axis of the motor, and the rotary mirror is integrally formed on the rotor at a portion of the rotor supported by at least two bearings to each other out of the bearings. The rotary mirror is integrally formed on the rotor at a portion of the rotor supported by at least two bearings, and the rotor is rotatably coupled to a spindle affixed to a stator of the motor through the bearing. The spindle is provided with a tubular portion to be coupled with a portion of the spindle protruding from the main body. The rotary mirror is integrally formed on the tubular portion.

12 Claims, 5 Drawing Figures

BEAM CONVERTER IN OPTICAL MEASURING INSTRUMENT

BACKGROUND OF THE INVENTION

1. Field of the Invention

This invention related to optical measuring instruments and more particularly, to improvements in a ray beam converter having a rotary mirror for reflecting ray beams and converting the same into rotary scanning ray beams in an optical measuring instrument for measuring dimensions and the like of a workpiece to be measured by the utilization of the rotary scanning ray beams.

2. Description of the Prior Art

There have heretofore been optical measuring intruments, in which ray beams (laser beams) from a beam generator are reflected by a rotary mirror to be converted into rotary scanning ray beams, and dimensions and the like of a workpiece to be measured are measured by the utilization of the rotary scanning ray beams.

More specifically, as shown in FIG. 1, laser beam 12 are oscillated from a laser tube 10 (beam generator) toward a stationary mirror 14, the laser beam 12 thus reflected are converted into scanning ray beams 17 by a rotary mirror 16, the scanning ray beams 17 are converted into parallel scanning ray beams 20 by a collimator lens 18, a workpiece 24 to be measured interposed between the collimator lens 18 and a condensing lens 22 is scanned at high speed by the parallel scanning ray beams 20, and dimensions in the scanning direction (direction Y) of the workpiece 24 to be measured are measured from the time length of a dark portion or a bright portion generated due to the obstruction of the parallel scanning ray beams by the workpiece 24 to be measured.

The bright and dark portions of the parallel scannning ray beams 20 are detected as variations in input voltage of a light receiving element 26 disposed at the focal point of the condensing lens 22. Signals from the light receiving element 26 is fed to a pre-amplifier 28, where they are amplified (Refer to v), and then, fed to a segment (selector) circuit 30. This segment selector circuit 30 is adapted to generate a voltage V from the voltage outputted from the light receiving element 26 to open a gate circuit 32 only for a time t, during which the workpiece 24 to be measured is scanned, from the time of the voltage output of the light receiving element 26 and feeds the same to the gate circuit 32. A continuous clock pulses CP is fed to this gate circuit 32 from a clock pulse oscillator circuit 34, whereby the gate circuit 32 generates clock pulses P for counting the time t corresponding to a dimension in the scanning direction, for example, the outer diameter of the workpiece 24 to be measured and feeds the same to a counter circuit 36. Upon counting the clock pulses P, the counter circuit 36 feeds a count signal to a digital indicator 38, where the dimension in the scanning direction, i.e., the outer diameter of the workpiece 24 to be measured is digitally indicated.

In FIG. 1, designated at reference numeral 40 is a synchronous sine wave oscillator circuit, 42 a power amplifier and 44 a synchronous motor. The synchronous motor 44 rotates the rotary mirror 16 in synchronism with the clock pulses in response to synchronous signals fed from the synchronous sine wave oscillator circuit 40 in response to the continuous clock pulses CP fed from the clock pulse oscillator circuit 34, whereby the measuring accuracy is maintained.

The above described measuring method and device have been widely utilized because the lengths, thickness and the like of moving workpieces and workpieces heated to a high temperature can be measured at high accuracies in non-contact relationship therewith.

The aforesaid polygonal rotary mirror 16 in the optical measuring instrument of the type described is secured to a rotary shaft of a synchronous motor 44, however, in general, an eccentricity of the rotary mirror 16 at the time of being secured to the synchronous motor 44 and an inclination of the center axis of the configuration of the rotary mirror 16 relative to the rotary center axis of the motor and the like are not avoidable. Owing to those disadvantages, it has been inevitable that the rotary scanning ray beams 17 reflected by the rotary mirror 16 are disturbed to a certain extent.

Furthermore, eccentric rotation may occur in the rotor itself of the synchronous motor 44, and turbulences of the rotary scanning ray beams 17, and in its turn, of the parallel scanning ray beams 20 due to the eccentric rotation have been unavoidable.

Further, the aforesaid polygonal rotary mirror 16 has been ground and polished into a polygonal shape from a block of optical glass, and subjected to works such as vacuum-deposition onto the surfaces thereof with metal films, whereby the product is heavy in weight, reflecting surfaces composing respective surfaces of a polygon should be formed concentrical with the rotary center axis and in directions tangential to the rotating circle, and it is difficult to polish accurately, thus resulting in highly increased manufacturing cost.

Additionally, normally, a hexagonal shape and octagonal shape are used as the polygonal shape for the rotary mirror. The more the number of surfaces is, the more difficult the manufacture is and the lower the accuracy becomes. Further, a distance between the rotary surface of the rotary mirror 16 and the collimator lens 18 is periodically fluctuated in accordance with the rotation of the rotary mirror 16, whereby the parallel scanning ray beams 20, should necessarily be disturbed, to thereby cause a measuring error to a certain extent. However, the polygonal surfaces of the rotary mirror 16 cannot be polished accurately, thus presenting the disadvantage that the measuring error is further increased due to the insufficient polishing.

SUMMARY OF THE INVENTION

It is therefore the primary object of the present invention to provide a ray beam converter in an optical measuring instrument, in which there are reduced the influences of an eccentricity of the rotary mirror relative to the motor, an inclination of the rotary shaft of the rotary mirror and eccentric (rotation) of the rotor of the motor, so that the turbulence of the rotary scanning ray beams reflected can be reduced.

It is the secondary object of the present invention to provide a ray beam converter in an optical measuring instrument which can be easily manufactured at low cost, is rendered light in weight, and in which the parallelisms to the rotary center axis and to directions tangential to the rotating circle are accurate, so that the measuring error can be reduced.

To the above end, the present invention contemplates that, in a ray beam converter having a rotary mirror driven by a motor, for reflecting ray beams to convert the same into rotary scanning ray beams in an optical measuring instrument wherein the ray beams from a beam generator are converted into the rotary scanning ray beams to be scanned in one direction and dimensions and the like of the workpiece to be measured are measured by the utilization of the rotary scanning ray beams, a rotor of the motor is rotatably supported by bearings at a plurality of positions in a direction of the rotary axis of the motor, and the rotary mirror is integrally formed on the rotor at a portion of the rotor supported by at least two bearings adjacent to each other out of the aforesaid bearings.

To the above end, the present invention contemplates that the rotary mirror is obtained by forming the outer periphery of the rotor into polygonal surfaces of mirrors.

To the above end, the present invention contemplates that the outer periphery of the portion of the rotor supported by at least the two bearings is formed into a circular outer peripheral surface, and the rotary mirror is constructed such that a plurality of planar reflecting mirrors having equal thicknesses, in each of which a reflecting surface is parallel to a rear surface thereof, are secured at the rear surfaces thereof and in line-to-line contact with the circular outer peripheral surface of the rotor thereto in a manner to be disposed substantially equidistantly in the circumferential direction and in parallel to an axial line of the rotor.

To the above end, the present invention contemplates that the plurality of planar reflecting mirrors are urged at opposite end portions in the longitudinal direction thereof against and held on the circular outer peripheral surface of said tubular portion by means of pair of annular elastic holders.

To the above end, the present invention contemplates that the plurality of planar reflecting mirrors are solidly secured together with said holders to said tubular portion by means of a bonding agent filled up in spaces formed between the inner peripheries of said holders, said planar reflecting mirrors and said tubular portion.

To the above end, the present invention contemplates that the plurality of planar reflecting mirrors are urged at opposite end portions in the longitudinal direction thereof against and held on the circular outer peripheral surface of said tubular portion by means of pair of annular elastic holders each formed on the inner periphery thereof with recesses equal in number to said planar reflecing mirrors at substantially regular pitches in the circumferential direction, and solidly secured together with said holders to said tubular portion by means of a bonding agent filled up in spaces formed between the inner peripheries of said holders, said planar reflecting mirrors and said tubular portion.

To the above end, the present invention contemplates that a flange-shaped stopper ring having a diameter substantially equal to said holders is integrally formed on an end portion of said tubular portion on the motor's side, and a stopper ring abutted against the outer ends of said planar reflecting mirrors and the holder is coupled onto the outer end portions of said tubular portion from the outer end, whereby said planar reflecting mirrors are regulated in position in the axial direction of said tubular portion by said pair of stopper rings.

To the above end, the present invention contemplates that the flange-shaped stopper ring and the other stopper ring are integrally, adhesively affixed by said bonding agent to the holders together with said planar reflecting mirrors, respectively, whereby said planar reflecting mirrors are integrally affixed in the axial direction of said tubular portion.

Futhermore, to the above end, the present invention contemplates that the rotor is rotatably coupled to a spindle affixed to a stator of the motor through the bearings, provided with a tubular portion to the coupled to a portion protruded from the main body of rotor of the spindle, and the rotary mirror is integrally formed on the tubular portion.

DETAILED DESCRIPTION OF THE PREFERRED EMBODIMENTS

Description will hereunder be given of an embodiment of the present invention with reference to the drawings.

Figure 1:
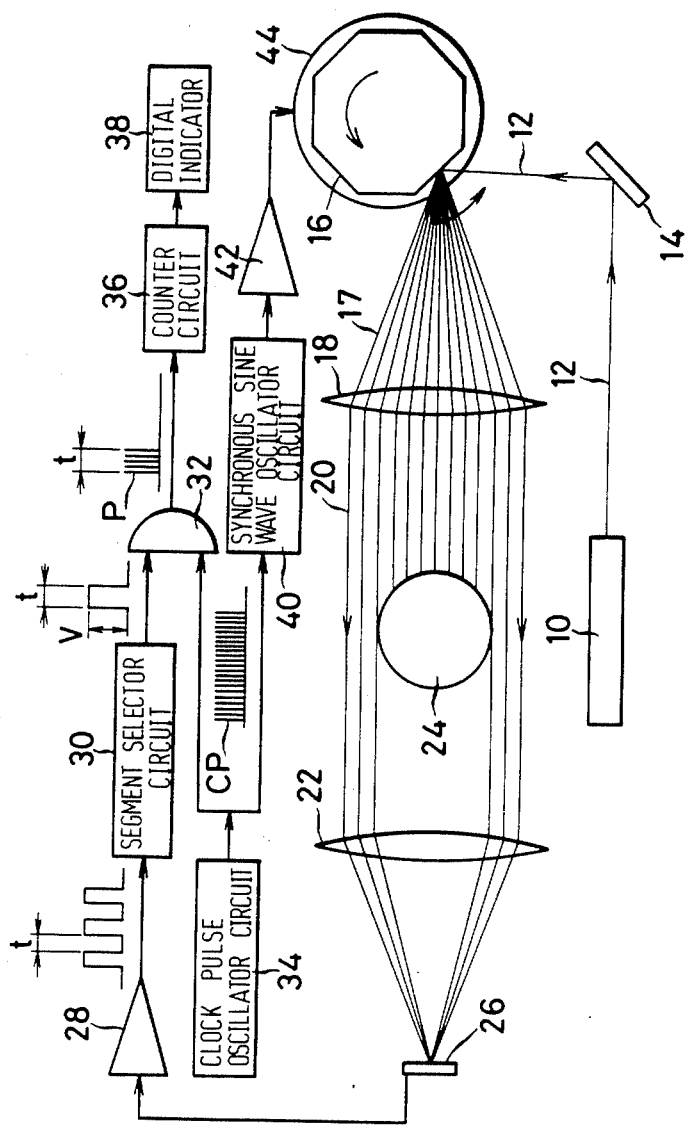
FIG. 1 is a block diagram showing the conventional optical measuring instrument.

In this embodiment, same reference numerals as shown in FIG. 1 are used to designate same or similar parts, so that detailed description will be omitted.

According to this embodiment, in a ray beam converter 46 including a rotary mirror 16 for reflecting the ray beam 12 and converting the same into rotary scanning ray beams 17 and a sychronous motor 44 to drive the rotary mirror 16 in an optical measuring instrument as shown in FIG. 1, a rotor 48 of the synchronous motor 44 is rotatably supported by bearings 50A and 50B at two positions in a direction of the rotary axis of the motor and the aforesaid rotary mirror 16 is integrally formed on the rotor 48 between the two bearings 50A and 50B.

The rotor 48 is rotatably coupled to a spindle 54 affixed to a stator 52 of the synchronous motor 44 through the bearings 50A and 50B, has a tubular portion 48B coupled to a portion protruded from a main body 48A of rotor of the spindle 54, and the rotary mirror 16 is integrally formed on this tubular portion 48B.

In the drawing, designated at 56 is a permanent magnet secured to the main body 48A of rotor, 58 a coil opposed to the permanent magnet 56 and disposed on the side of the stator 52, designated at 60 is a yoke contiguous to the coil 58 and secured to the stator 52, and designated at 62 is an encoder opposed to the rotor 48 and secured to the stator 52, for detecting the rotation of the rotor 48.

Figure 2:
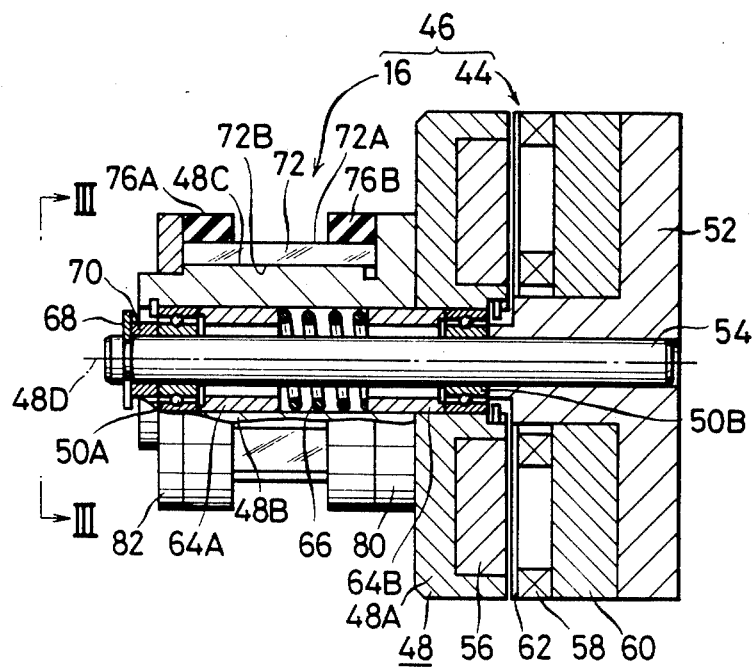
FIG. 2 is a sectional view showing an embodiment of the ray beam converter in the optical measuring instrument according to the present invention.

Furthermore, designated at 64A and 64B in FIG. 2 are keep rings coupled to the inner periphery of the tubular portion 48B of the rotor 48, for being biased by a spring 66 in directions of being separated from each other to thereby regulate positions of the bearings 50A and 50B in the axial direction thereof, and designated at 68 is an E washer for regulating the bearing 50A at an outer end in its position in the axial direction thereof through a keep ring 70.

The outer periphery of the tubular portion 48B of the rotor 48 is formed into a circular outer peripheral surface 48C, and the rotary mirror 16 is constructed such that eight planar reflecting mirrors 72 having equal thicknesses, in each of which a reflecting surface 72A is parallel to a rear surface 72B thereof, are secured at the rear surfaces 72B thereof and in line-to-line contact with the circular outer peripheral surface 48C of the tubular portion 48B of the rotor 48 in a manner to be disposed substantially equidistantly in the circumferential direction and in parallel to an axial line 48D of the rotor 48.

The plurality of planar reflecting mirrors 72 are urged at opposite end portions in the longitudinal direction thereof against and held on the circular outer peripheral surface 48C of the tubular portion 48B by means of a pair of annular elastic holders 76A and 76B each formed on the inner periphery thereof with recesses 74 equal in number to the planar reflecting mirrors 72 at substantially regular pitches in the circumferential direction, and solidly secured together with the holders 76A and 76B to the tubular portion 48B by means of a bonding agent 78 filled up in spaces formed between the inner peripheries of the holders 76A and 76B, the planar reflecting mirrors 72 and the tubular portion 48B.

Integrally formed on an end portion of the tubular portion 48B on the side of the motor 44 is a flange-shaped stopper ring 80 having a diameter substantially equal to the holders 76A and 76B.

In consequence, the holder 76B and the plurality of planar reflecting mirrors 72 coupled into the recesses 74 on the end portion of the motor 44 are positioned in the axial direction by being abutted against the flange-shaped stopper ring 80.

Further, both the outer ends of the planar reflecting mirrors 72 and the outer end of the holder 76A are abutted against a stopper 82 coupled onto the tubular portion 48B from the outer end thereof.

The flange-shaped stopper ring 80 and the stopper ring 82 are integrally, adhesively affixed by the bonding agent 78 to the holders 76A and 76B together with the planar reflecting mirrors 72, respectively, whereby the planar reflecting mirrors 72 are integrally affixed in the axial direction of the tubular portion 48B.

The holders 76A and 76B in this embodiment are formed of a soft elastic material such as rubber so that the planar reflecting mirrors 72 coupled into the recesses 74 thereof can be urged against the circular outer peripheral surface 48C of the tubular portion 48B.

In this embodiment, the rotary mirror 16 is integrally formed on the rotor 48 of the synchronous motor 44 and disposed at a position between the pair of bearings 50A and 50B in the axial direction, which support this rotor 48, whereby the eccentricity, the inclination in the axial direction and the like at the time of securing are eliminated as compared with the case where the rotary mirror is secured to the rotary shaft of the motor, and moreover, the eccentric rotation of the rotor 48 itself is low at the position between the bearings 50A and 50B, so that the turbulence on the reflecting surfaces 72A of the planar reflecting mirrors 72 composing the rotary mirror 16 and the turbulence on the reflecting surfaces can be suppressed, thereby improving the measuring accuracy by suppressing the turbulence of the rotary scanning ray beams 17, and in its turn, the turbulence of the parallel scanning ray beams.

Here, the planar reflecting mirrors 72 urged against the circular outer peripheral surface 48C by the holders 76A and 76B have a dispersion in the pitches thereof in the circumferential direction due to the accuracies of the pitches of the recesses 74, however, the dispersion in the pitches affects only the cycles of scannings, i.e. the intervals of the cycles of measurings, and does not affect the measuring accuracy at all.

Figure 3:
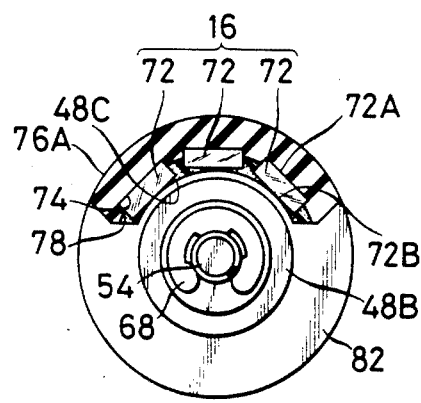
FIG. 3 is a sectional view taken along the line III—III in FIG. 2.

Furthermore, the planar reflecting mirror 72, when the rear surface 72B thereof is urged against the circular outer peripheral surface 48C by the holders 76A and 76B, has the rear surface 72B thereof becoming constantly tangential to the circular outer peripheral surface 48C as shown in FIG. 3, whereby the reflecting surfaces 72A parallel to the rear surfaces 72B are positioned in directions accurately tangential to the rotating circle of the tubular portion 48B, so that an error due to the parellelism of the reflecting surface 72A can be reduced to a considerable extent.

One and the same planar reflecting mirror of a large size can be dividedly cut into the respective planar reflecting mirrors 72, and moreover, in general, the planar reflecting mirrors can be manufactured with high accuracy and at low cost, so that a plurality of planar reflecting mirrors 72 high in accuracy can be easily obtained at low cost.

In this embodiment, if the flange-shaped stopper ring 80 and the stopper ring 82 are disposed in the downward direction, respectively, at the time of filling the bonding agent 78, then dams can be formed for the fluidal bonding agent 78.

Further, the plurality of planar reflecting mirrors 72 are secured to the circular outer peripheral surface 48C of the tubular portion 48B through the annular holders 76A and 76B formed of an elastic material such as rubber, however, the present invention need not necessarily be limited to this, and any members may be used, only if the members can urge the rear surfaces 72B of the planar reflecting surfaces 72 against the cicular outer peripheral surface of the tubular portion 48B and hold the same thereon. In consequence, simply annular holders and the like may be used, for example. However, as in the above embodiment, the holders 76A and 76B each formed at the inner periphery thereof with a recess 74 are advantageous in that the plurality of planar reflecting mirrors 72 are disposed at regular pitches in the circumferential direction on the circular outer peripheral surface of the tubular portion 48B.

Moreover, the longitudinal end portions of the planar reflecting mirrors 72 are regulated in their positions by the flange-shaped stopper ring 80 integrally formed on the tubular portion 48B and the stopper ring 82 coupled onto the tubular portion 48B, however, the present invention need not necessarily be limited to this, and any stopper rings may be used only if the stopper rings can regulate in position the opposite end portions of the planar reflecting mirrors 72 in the longitudinal direction of the tubular portion 48B.

Furthermore, the above embodiment is concerned with the octagonal mirror having eight planar reflecting mirrors 72, however, the present invention need not necessarily be limited to this, and the number of the planar reflecting mirrors 72 may be 7 or less, or 9 or more.

Additionally, when the number of surfaces of the polygon, i.e. the number of the planar reflecting mirrors 72 is changed, the planar reflecting mirrors should be held by the holders 76A and 76B each formed with recesses 74 corresponding in number to the planar reflecting mirrors.

Figure 4:
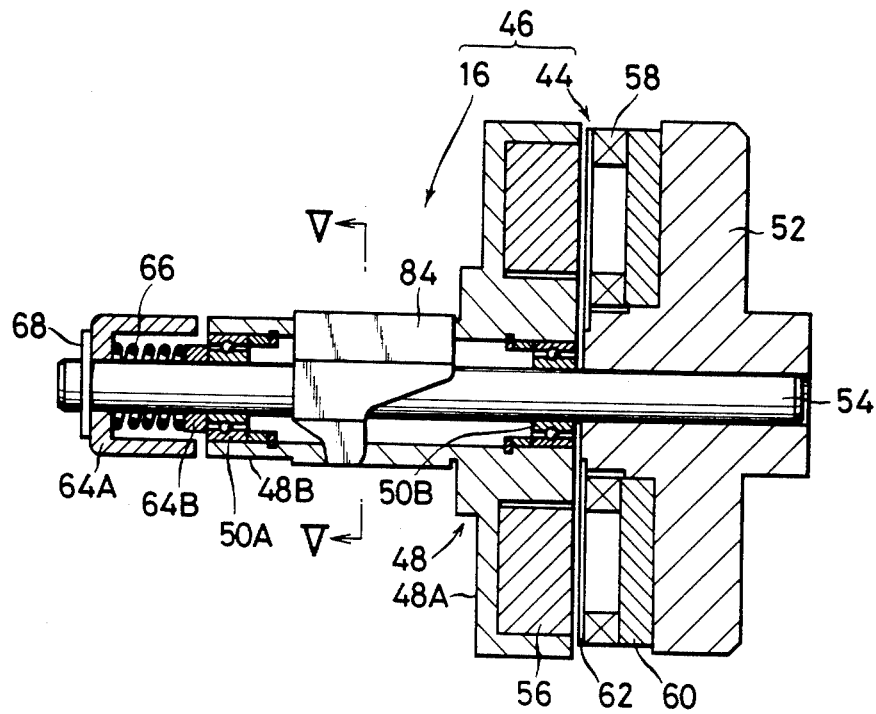
FIG. 4 is a sectional view similar to FIG. 2, showing a second embodiment of the present invention.
Figure 5:
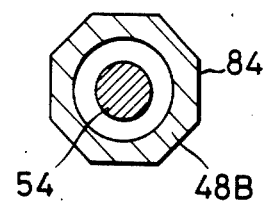
FIG. 5 is a sectional view taken along the line V—V FIG. 4.

Description will hereunder be given of the second embodiment shwon in FIGS. 4 and 5.

This second embodiment is of such an arrangement that the rotary mirror 16 is obtained by forming the outer periphery of the tubular portion 48B of the rotor 48 into polygonal surfaces of mirrors 84.

Other arrangement of the second embodiment are substantially indentical with those in the first embodiment, and hence, same reference numerals as shown in the first embodiment are used to designate same or similar parts, so that detailed description will be omitted.

This embodiment is advantageous in that the polygonal surfaces of mirrors 84 are formed directly on the outer periphery of the tubular portion 48B of the rotor 48, to thereby form the rotary mirror 16, whereby the construction is simple, and, as compared with the first embodiment shown in FIGS. 2 and 3, the second embodiment is applicable to a use condition requiring a high rotation having a centrifugal force which the planar reflecting mirrors 72 in the first embodiment could not stand.

Furthermore, in both the above-described embodiment, the rotor 48 is rotatably secured to the spindle affixed to the stator 52 through the bearings 50A and 50B, however, the present invention need not necessarily be limited to this.

Further, in the respective embodiments described above, the rotor 48 is rotatably supported by the pair of bearings 50A and 50B, however, the present invention need not necessarily be limited to this, and the number of the bearings may be three or more, and the rotary mirror may be provided on a portion supported by more than two bearings.

What is claimed is:

1. A ray beam converter having a rotary mirror driven by a motor, for reflecting ray beams to convert the same into rotary scanning ray beams in an optical measuring instrument wherein said ray beams from a beam generator are converted into said rotary scanning ray beams to be scanned in one direction and dimensions of a workpiece to be measured are measured by the utilization of said rotary scanning ray beams, characterized in that a rotor of said motor is rotatably supported by bearings at a plurality of positions in a direction of the rotary axis of said motor, said rotary mirror is integrally formed on said rotor at a portion of said rotor supported by at least two bearings adjacent to each other, and said rotor is rotatably coupled to a spindle affixed to a stator of said motor through said bearings, said spindle being provided with a tubular portion to be coupled to a portion of the spindle protruding from a main body of the rotor, and said rotary mirror is integrally formed on said tubular portion.

2. A ray beam converter in an optical measuring instrument as set forth in claim 1, wherein the tubular portion includes an inner end adjacent the motor and an outer end opposite said inner end, and wherein the outer periphery of the portion of said tubular portion supported by at least said two bearings is formed into a circular outer peripheral surface, and said rotary mirror is constructed such that a plurality of planar reflecting mirrors having equal thicknesses and corresponding inner and outer ends, in each of which mirrors a reflecting surface is parallel to a rear surface thereof, are secured at the rear surfaces thereof and in line-to-line contact with the circular outer peripheral surface of said tubular portion thereto in a manner to be disposed substantially equidistantly in the circumferential direction and in parallel to an axial line of said rotor.

3. A ray beam converter in an optical measuring instrument as set forth in claim 2, wherein said plurality of planar reflecting mirrors are urged at opposite end portions in the longitudinal direction thereof against and held on the circular outer peripheral surface of said tubular portion by means of a pair of annular elastic holders, each holder having an external diameter.

4. A ray beam converter in an optical measuring instrument as set forth in claim 3, wherein said plurality of planar reflecting mirrors are solidly secured together with said holders to said tubular portion by means of a bonding agent filled up in spaces formed between the inner peripheries of said holders, said planar reflecting mirrors and said tubular portion.

5. A ray beam converter in an optical measuring instrument as set forth in claim 2, wherein said plurality of planar reflecting mirrors are urged at opposite end portions in the longitudinal direction thereof against and held on the circular outer peripheral surface of said tubular portion by means of a pair of annular elastic holders, each holder having an external diameter and a periphery thereof with recesses equal in number to said planar reflecting mirrors at substantially regular pitches in the circumferential direction, and solidly secured together with said holders to said tubular portion by means of a bonding agent filled up in spaces formed between the inner peripheries of said holders, said planar reflecting mirrors and said tubular portion.

6. A ray beam converter in an optical measuring instrument as set forth in claim 3, wherein a flange-shaped stopper ring having a diameter substantially equal to the diameter of said holders is integrally formed on the inner end portion of said tubular portion on the motor's side, and another stopper ring abutted against the outer ends of said planar reflecting mirrors and the holder is coupled onto the outer end portion of said tubular portion from the outer end, whereby said planar reflecting mirrors are regulated in position in the axial direction of said tubular portion by said pair of stopper rings.

7. A ray beam converter in an optical measuring instrument as set forth in claim 5, wherein a flange-shaped stopper ring having a diameter substantially equal to the diameter of said holders is integrally formed on the inner end portion of said tubular portion on the motor's side, and another stopper ring abutted against the outer ends of said planar reflecting mirrors and the holder is coupled onto the outer end portion of said tubular portion from the outer end, whereby said planar reflecting mirrors are regulated in position in the axial direction of said tubular portion by said pair of stopper rings.

8. A ray beam converter in an optical measuring instrument as set forth in claim 6, wherein the flange-shaped stopper ring and the other stopper ring are integrally, adhesively affixed by said bonding agent to the holders together with said planar reflecting mirrors, respectively, whereby said planar reflecting mirrors are integrally affixed in the axial direction of said tubular portion.

9. A ray beam converter in an optical measuring instrument as set forth in claim 7, wherein the flange-shaped stopper ring and the other stopper ring are integrally, adhesively affixed by said bonding agent to the holders together with said planar reflecting mirrors, respectively, whereby said planar reflecting mirrors are integrally affixed in the axial direction of said tubular portion.

10. A ray beam converter in an optical measuring instrument as set forth in claim 1, wherein said rotor is rotatably coupled to a spindle affixed to a stator of said motor through said bearings, provided with said tubular portion to be coupled to said portion protruded from the main body of rotor of the spindle, and said rotary mirror is integrally formed on said tubular portion.

11. A ray beam converter in an optical measuring instrument as set forth in claim 2, wherein said rotor is rotatably coupled to a spindle affixed to a stator of said motor through said bearings, provided with said tubular portion to be coupled to said portion protruded from the main body of rotor of the spindle, and said rotary mirror is integrally formed on said tubular portion.

12. A ray beam converter in an optical measuring instrument as set forth in claim 3, wherein said rotor is rotatably coupled to a spindle affixed to a stator of said motor through said bearings, provided with said tubular portion to be coupled to said portion protruded from the main body of rotor of the spindle, and said rotary mirror is integrally formed on said tubular portion.

* * * * *